United States Patent [19]

Pohlig et al.

[11] Patent Number: 4,511,797
[45] Date of Patent: Apr. 16, 1985

[54] CIRCUIT ARRANGEMENT FOR POSITIONING THE PRINTING MECHANISMS IN PRINTERS EMPLOYING A D.C. MOTOR

[75] Inventors: Dietmar Pohlig, Munich; Ernst Goepel, Germering, both of Fed. Rep. of Germany

[73] Assignee: Siemens Aktiengesellschaft, Berlin & Munich, Fed. Rep. of Germany

[21] Appl. No.: 462,402

[22] Filed: Jan. 31, 1983

[30] Foreign Application Priority Data

Apr. 20, 1982 [DE] Fed. Rep. of Germany ....... 3214554

[51] Int. Cl.³ ............................................... G01D 5/34
[52] U.S. Cl. .............................. 250/231 SE; 318/480; 377/17
[58] Field of Search ............. 250/231 SE, 237 G; 340/347 P; 356/395; 318/601, 603, 640, 648, 652, 480, 577; 377/15, 17, 29, 42, 45, 53, 85; 364/519, 167, 174, 183; 400/279

[56] References Cited

U.S. PATENT DOCUMENTS 3,935,447 1/1976 Black et al. .................. 250/231 SE
4,112,413 9/1978 Muhs et al. .................. 250/231 SE
4,463,435 7/1984 Cavill ................................. 318/603

Primary Examiner—David C. Nelms
Attorney, Agent, or Firm—Hill, Van Santen, Steadman & Simpson

[57] ABSTRACT

A d.c. motor positions printing mechanisms. A circuit arrangement is provided in which a scanner disc, having peripheral slots, is arranged on the shaft of the motor and the slots are scanned by a scanner and counted in the positive direction and in the negative direction by a counter so that the position of the printing mechanism is determined. When the d.c. motor is decelerated and a generator voltage arises, the direction is determined by a rotation direction discriminator which evaluates the generator voltage and the zero transition thereof in the event of a change in the rotation direction of the d.c. motor. To control the direction of counting of the counter.

4 Claims, 3 Drawing Figures

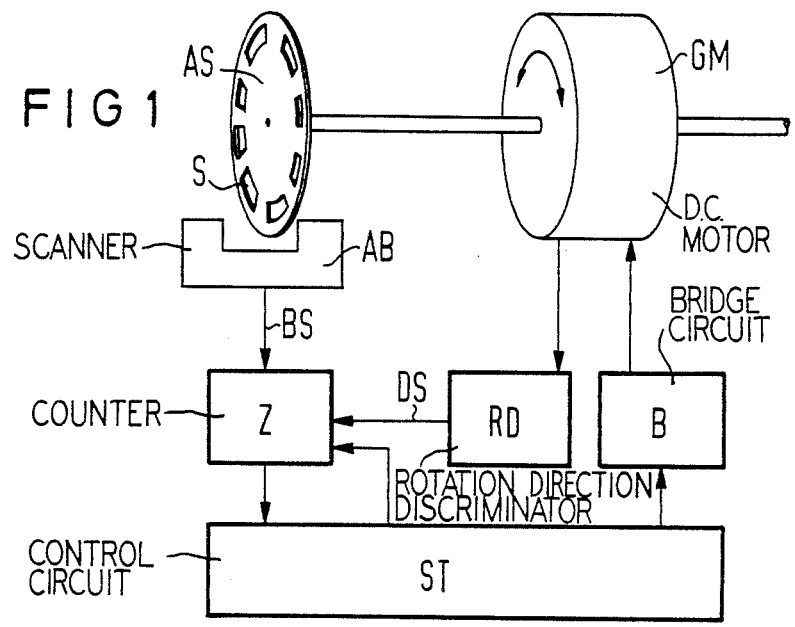
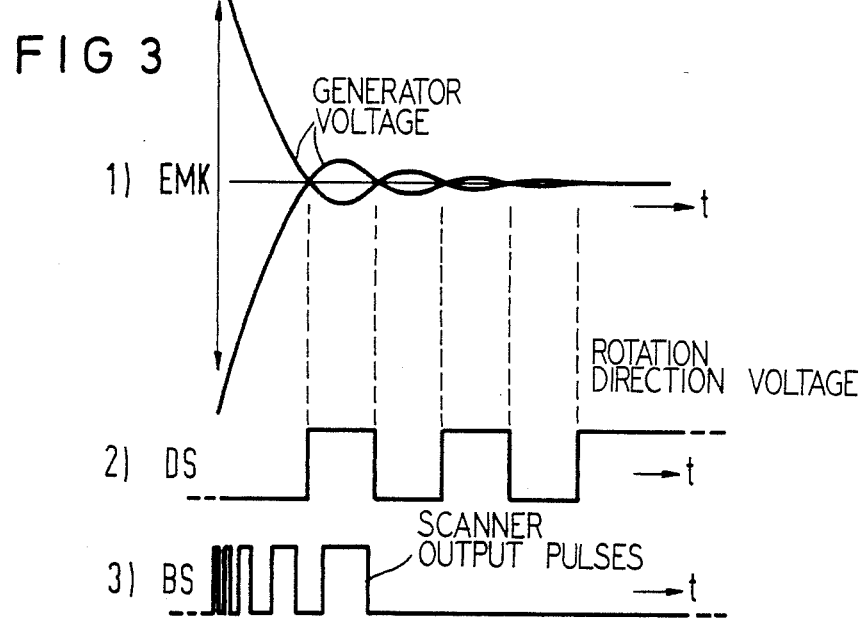

CIRCUIT ARRANGEMENT FOR POSITIONING THE PRINTING MECHANISMS IN PRINTERS EMPLOYING A D.C. MOTOR

BACKGROUND OF THE INVENTION

1. Field of the Invention

The present invention relates to a circuit arrangement for positioning printing mechanisms in printers, and is more particularly concerned with determining the position of a printing mechanism which is driven by a d.c. motor, where the position is determined by the number which is displayed on a counter and which is determined by counting the pulses of an optical scanner in a positive direction and in a negative direction.

2. Description of the Prior Art

In end-of-text printing devices, such as teleprinters and typewriters, frequently the printing mechanism is moved relative to a stationary platen. Generally, the printing mechanism is driven by a separate motor or via a toothed belt or the like.

It is known to determine the position of the printing mechanism relative to the platen or to the data carrier by optically scanning the slots in a scanner disc which is attached to the motor shaft of the driving d.c. motor. In order to detect a clearly-defined position, normally two incremental scanners are required which, when a shaft rotates, emit two pulse signals, electrically displaced in phase by 90°. The position of the printing mechanism is determined in that the pulses emitted from the optical scanner are added and, in fact, with a positive sign in one movement of direction of the printing mechanism and with a negative sign in the other direction. The positive or negative sign is obtained from the phase position of the two pulse signals. The scanners employed in this arrangement both need to be electrically and/or mechanically adjusted, which requires a relatively high expense.

SUMMARY OF THE INVENTION

The object of the present invention is to provide a circuit arrangement in which only one scanner is used to determine the position of a printing mechanism which is driven by a d.c. motor.

This object is realized, in a system of the type generally set forth above, in that a single-channel, incremental scanner and a rotation direction discriminator are provided. In the event of the generator operation of the d.c. motor and in the event of every change of rotational direction, i.e. every polarity change or zero transition of the generator voltage, the rotation direction discriminator changes its output signal. For every change in the output signal of the rotation direction discriminator, a counter changes its direction of counting.

The rotation direction discriminator may advantageously comprise a differential amplifier whose inputs are connected to receive generator voltage and only one supply voltage is required.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 1 is a block circuit diagram of a circuit arrangement constructed in accordance with the present invention for the positioning of a printing mechanism;

FIG. 3 is a signal diagram illustrating signals at different points in FIG. 1.

DESCRIPTION OF THE PREFERRED EMBODIMENTS

Figure 2:
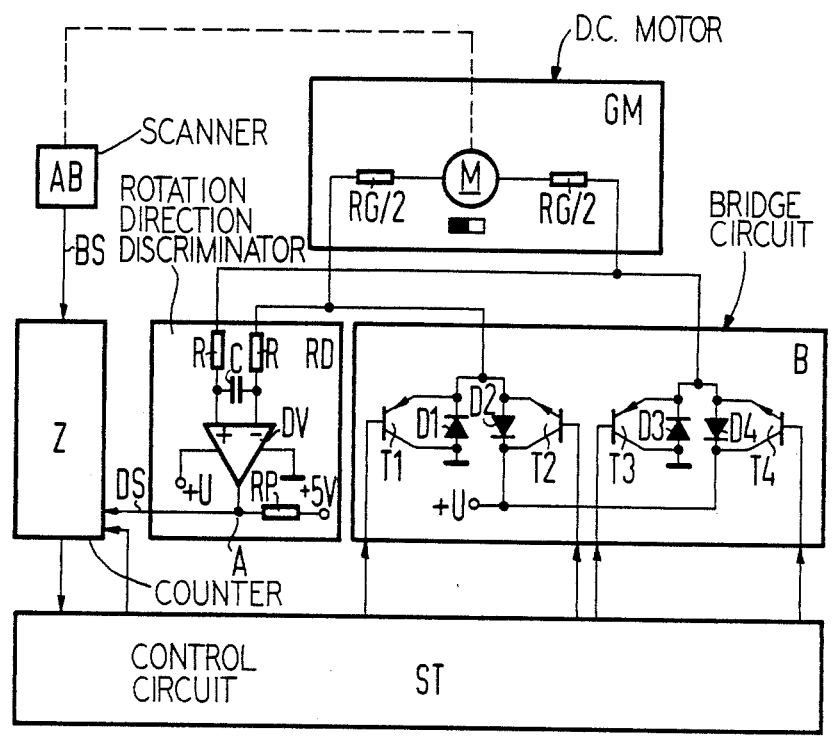
FIG. 2 is a schematic circuit diagram of a known bridge circuit for the control of a d.c. motor and a circuit diagram of an exemplary construction of a rotation direction discriminator.

FIG. 1 represents the basic circuit assemblies used for the positioning of a printing mechanism with a d.c. motor GM. A control circuit ST is provided to control these assemblies. A scanner disc AS is attached to the shaft of the d.c. motor GM which is driven via a bridge circuit B by the control circuit ST. Slots S are uniformly distributed over the periphery of the scanner disc AS. A single-channel, incremental scanner AB, which preferably comprises an optical scanner, supplies, in the event of a rotary movement of the scanner disc AS, pulses which are counted in a positive or negative direction by a counter Z. If the motor is brought out of the stationary state into a rotary movement in that the bridge circuit B is supplied with current from the control circuit ST, the direction of rotation is determined by the control circuit ST. If the generator decelerates the d.c. motor GM to a halt, i.e. if the control circuit ST no longer supplies a d.c. motor GM with current, the positive or negative direction of rotation is determined by a rotation direction discriminator RD, which will be discussed in detail below in association with FIG. 2. The signal emitted from the rotation direction discriminator RD is evaluated in the counter Z as a control criterion for the counting in a positive or negative direction of the pulses obtained from the scanner AB, so that the number which appears on the counter Z accurately defines the position for the printing mechanism which is driven by the d.c. motor GM.

FIG. 2 represents a detailed exemplary embodiment comprising a bridge circuit B which is known per se and which serves to control a d.c. motor GM and which comprises four transistors T1–T4 and four diodes D1–D4. The transistors T1–T4 are driven by the control circuit ST. During the motor operation of the d.c. motor GM, the transistors T1 and T4 are switched conductive for one direction of rotation of the motor, whereas the transistors T2 and T3 are switched conductive for the other direction, and in both cases the other transistors T2, T3 or T1, T4 are blocked. It will be assumed that the deceleration of the d.c. motor GM to a halt is brought about only by the generator operation, mechanical characteristics and friction, and not by counter torque control. In this case, for example, the transistors T2 and T4 are blocked, whereas the transistors T1 and T3 are conductive.

When the d.c. motor is decelerated in this manner, in that it is brought from a rotational movement to a halt, it will not always immediately come to a halt; in fact, attenuated mechanical vibrations of the drive system can occur which serve to change the rotation direction of the d.c. motor GM from the adjusted stationary position.

In order to determine this position it must therefore be ensured that the pulses supplied by the scanner AB are counted in a positive direction and in a negative direction by the counter Z in accordance with the true direction of rotation. Since the polarity of the generator voltage EMK produced by the d.c. motor GM during the deceleration process likewise undergoes a change in the event of a change in the direction of rotation of the d.c. motor GM, and therefore the generator voltage EMK exhibits a zero transition on the occasion of every change in the rotation direction of the d.c. motor (see also FIG. 3), the corresponding control criterion is available for the counter Z. This criterion is derived from the generator voltage EMK which is available on the supply lines of the d.c. motor GM. If the speed of rotation of the d.c. motor reduces towards zero, a fall also occurs in the generator voltage EMK. As a result, the transistors T1 and T3 and the diodes D3 and D1 become highly ohmic and do not represent a load for the d.c. motor GM which serves as a voltage generator with a load internal impedance RG. Therefore, the generator voltage EMK can be analyzed by a circuit arrangement having highly ohmic inputs. In the exemplary embodiment, a circuit arrangement of this kind represents a portion of the rotation direction discriminator RD.

The generator voltage EMK is connected, for example, to the inputs of a differential amplifier DV. Each input line contains a resistor R and a capacitor C is connected between the inputs of the differential amplifier DV. The resistors R serve not only to limit the input current but also, together with the capacitor C, to frequency-stabilize the feedback-free differential amplifier DV. The output A of the differential amplifier DV possesses, for example, an open collector. In this case, in the event of a polarity change in the generator voltage EMK, i.e. in the event of a zero transition thereof, the output acts in the manner of a switch which is connected to a reference potential in a highly-ohmic or a low-ohmic manner. As a result of an impedance RP at the output A, which is connected to a +5 V potential, for example, a TTL, −true direction signal is obtained from the output A of the differential amplifier DV, i.e. in the case of deceleration in one rotational direction of the d.c. motor GM corresponds to the one logic state of the directional signal, whereas the other direction of rotation corresponds to the other logic circuit. Consequently, the counter Z counts in a positive or negative direction those pulses arriving from the scanner AB.

The control circuit ST ensures that only when the d.c. motor GM is operated by the generator is the counter Z set in respect of its counting direction by the rotation direction signal DS from the rotation direction discriminator RD. On the other hand, when the d.c. motor is operated, the control circuit ST determines the counting direction of the counter itself. The signal emitted from the rotation direction discriminator RD during this phase is not analyzed.

A conventional differential amplifier circuit or similar amplifier circuit can be used for the rotation direction discriminator RD. It must only be ensured that in the event of zero transition in the generator voltage EMK of the d.c. motor GM, the counter Z changes its counting direction.

FIG. 3 illustrates the wave forms of the signals which occur during a deceleration process in various assemblies of the circuit arrangement. Here line 1 represents the generator sub-voltage use of the generator voltage EMK which occurs towards the ground point across the input resistors R of the differential amplifier DV, line 2 represents the output signal DS of the rotation direction discriminator RD, and line 3 represents the output signal BS of the scanner AB.

The output signal DS from the rotation direction discriminator RD (line 2) exhibits a shift at those points at which the generator voltage EMK undergoes a polarity change over a zero transition (line 1). With each decreasing rotation speed of the scanner disc AS the output signal BS from the scanner AB exhibits increasing pulse intervals. The final rotation vibrations of the d.c. motor G and of the scanner disc AS no longer lead to scanning pulses as soon as the amplitude of the rotation vibration falls below a specific limit value which is covered by the graduation of the scanner disc AS and the hysteresis of the scanner AB.

Although we have described our invention by reference to particular embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a circuit arrangement for determining the position of a printing mechanism which is driven by a d.c. motor, of the type in which the motor rotates a slotted disc adjacent optical scanner means, the optical scanner means produces pulses in response to rotation of the disc, and in which a display-type counter counts the scanner means output pulses in a positive direction and in a negative direction and displays a count corresponding to the position of the printing mechanism, the improvement wherein:

said scanner means comprises a single-channel incremental scanner operable to produce scanner output pulses; and further comprising a rotation direction discriminator including an input connected to the d.c. motor for receiving a damped alternating voltage generated by the motor upon deceleration and an output connected to the counter, said discriminator operable in response to zero crossings of the generated voltage to produce an output signal to change the direction of counting of the counter.

2. The improved circuit arrangement of claim 1, wherein said rotation direction discriminator comprises:

a differential amplifier including a pair of input terminals connected across the d.c. motor.

3. The improved circuit arrangement of claim 2, wherein said differential amplifier comprises:

an open collector output circuit.

4. The improved circuit arrangement of claim 3, wherein said discriminator further comprises:

a resistor connecting said output to a predetermined voltage so that the output signal is a transistor-to-transistor logic output signal.

* * * * *